D. G. JONES.
STALK CUTTER.
APPLICATION FILED MAY 9, 1914.
1,156,234.
Patented Oct. 12, 1915.
3 SHEETS—SHEET 3.
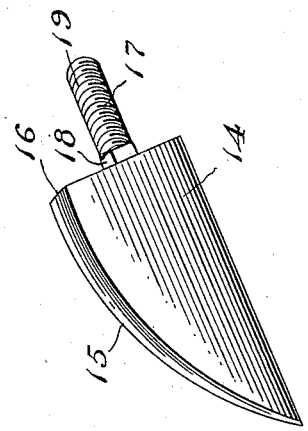
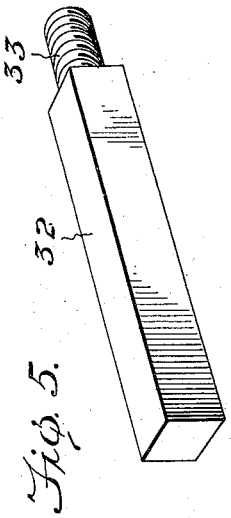
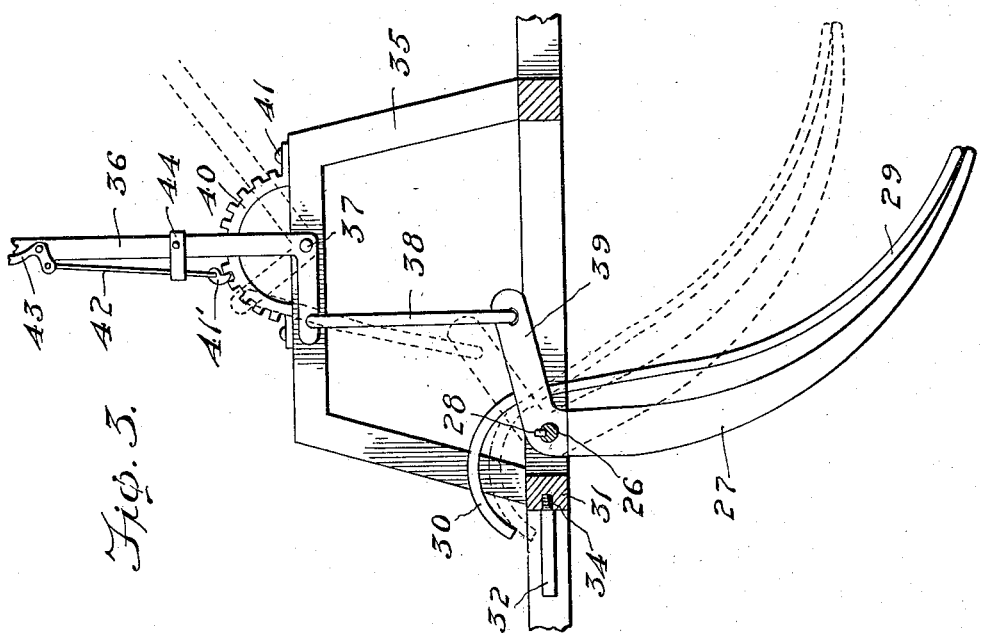
Witnesses
Paul M. Hunt
Thos. W. Downing.
Inventor
David G. Jones
By Richard B. Owen,
Attorney
COLUMBIA PLANOGRAPH CO., WASHINGTON, D. C.

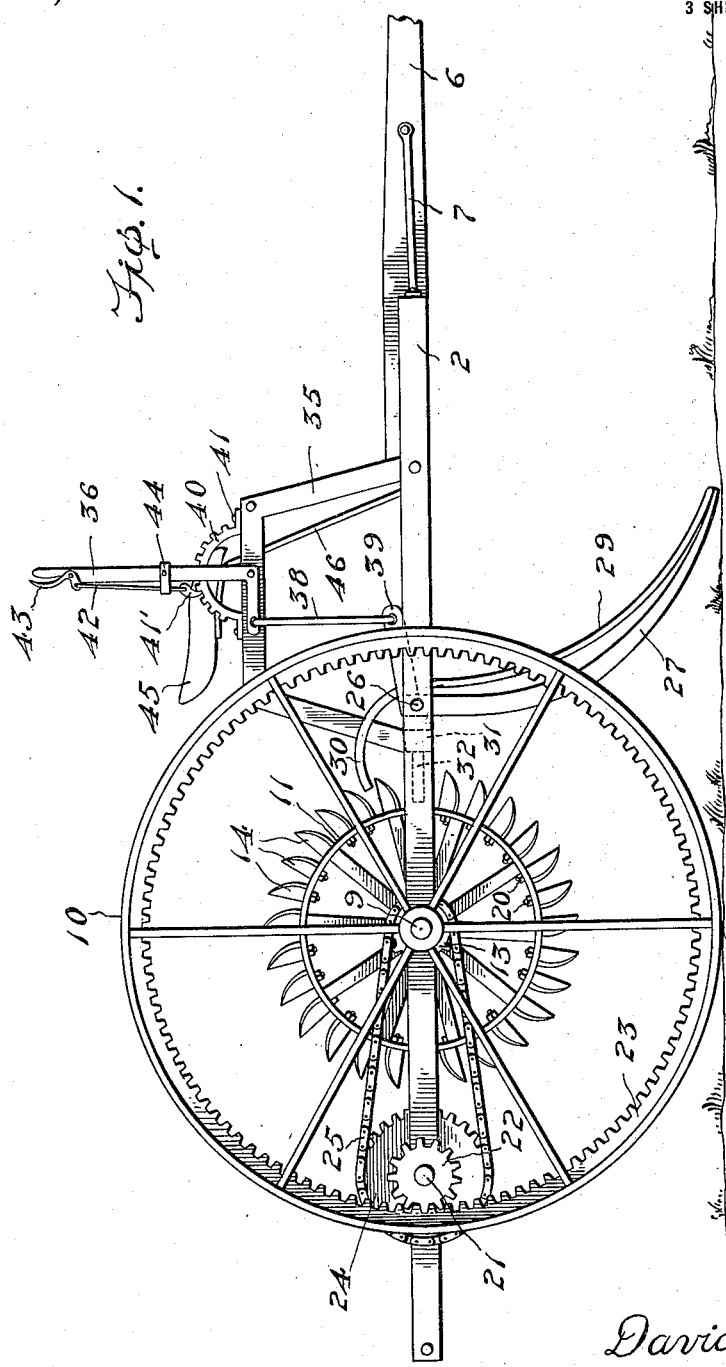

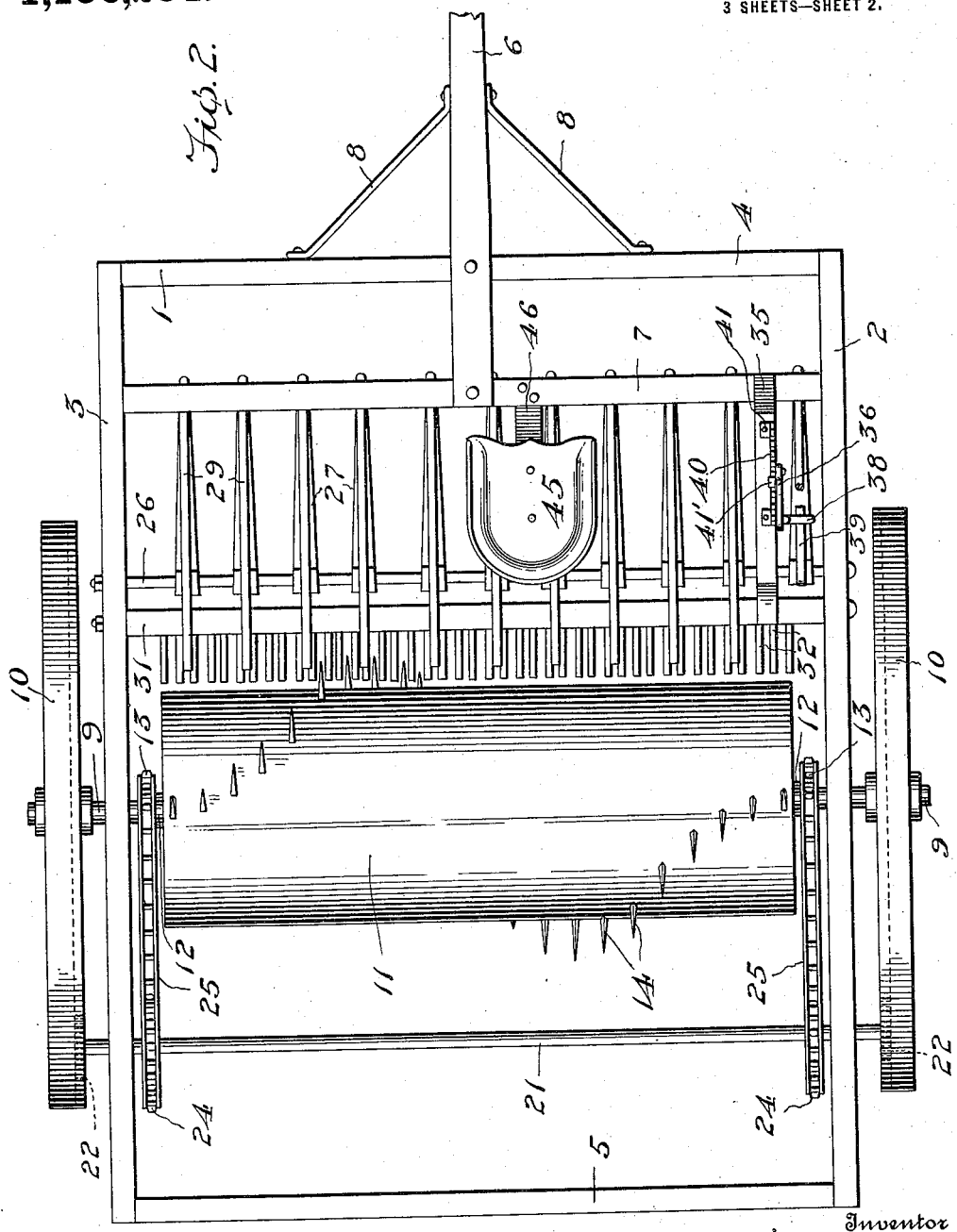

UNITED STATES PATENT OFFICE.

DAVID G. JONES, OF EMERSON, IOWA.

STALK-CUTTER.

1,156,234.
Specification of Letters Patent.
Patented Oct. 12, 1915.

Application filed May 9, 1914. Serial No. 837,531.

*To all whom it may concern:*

Be it known that I, DAVID G. JONES, a citizen of the United States, residing at Emerson, in the county of Mills and State of Iowa, have invented certain new and useful Improvements in Stalk-Cutters, of which the following is a specification.

My invention relates to stalk cutters.

The primary object of my invention resides in the provision of a stalk cutter having cutting means disposed thereon in spaced relation from the ground, the cutting means having means associated therewith for conveying the stalk on the ground to the same.

Another object of my invention resides in the provision of an improved supporting means for the stalk associated with the cutting means for facilitating the chopping of the stalk.

A further object of my invention resides in the provision of an improved cutting means in the form of a cylinder having a plurality of cutting elements disposed in spiral relation thereon and for coacting with the supporting means when operated.

A still further object of my invention resides in the provision of an improved conveying means in the form of rake teeth, the latter having means in connection therewith for guiding the stalk into engagement with the cutting means, the conveying means further provided with means for raising the same out of close relation to the ground when not in use.

A still further object of my invention resides in the provision of an operating means for the cutting means, the former being in connection with the wheels of the implement for increasing the speed of the cutting mechanism.

A still further object of my invention resides in the provision of a stalk cutter that is simple in construction efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

Referring to the drawings:—Figure 1 is a side elevational view of my invention; Fig. 2 is a top plan view of the same; Fig. 3 is an enlarged fragmentary view showing especially the construction and arrangement of the teeth having the guiding means thereon, together with the means for raising and lowering the same. Fig. 4 is an enlarged perspective view of one of the cutting elements; and Fig. 5 is an enlarged perspective view of one of the pins which forms a part of the supporting means for the stalk.

Referring more particularly to the drawings in which similar reference numerals designate corresponding parts throughout the different views, I provide a substantially rectangular frame 1, comprising side pieces 2 and 3 and end pieces 4 and 5, the forward end piece 4 having connected thereto a tongue 6, the inner end of which is connected to a cross bar 7 on the frame and which tongue is supported by suitable braces 8 rigidly connected to the sides thereof and the forward end piece 4. The side pieces 2 and 3 are provided at points substantially intermediate their ends with oppositely disposed alining openings through which is journaled a shaft 9, the outer ends of which extend beyond the side pieces and have keyed thereon wheels 10 for supporting the frame.

Rotatably mounted upon the axle shaft 9 and arranged in spaced relation with the sides of the frame is a cylinder 11, the latter being in connection with the shaft 9 by means of sleeves 12 which have a plurality of arms radiating therefrom and connected to the inner periphery of the cylinder 11 and serve to support the same, the sleeves having sprocket wheels 13 keyed to the outer ends thereof for a purpose to be hereinafter described. For the purpose of cutting stalk or the like into small pieces, I have provided the outer surface of the cylinder 11 with a plurality of transversely extending and uniformly spaced apart spirally arranged cutting elements, each of which in this instance consists of a blade 14 which has one side thereof curved as at 15, the edge of which is beveled as at 16 to form a cutting edge and which blade is reduced to form a shank 17, the inner end of which is squared as at 18 for preventing rotation of the blade and the outer end being screw-threaded as at 19 for engagement with a nut 20 after the shank has been passed through the openings in the cylinder.

For the purpose of rotating the cylinder 11 at a greater speed than the wheels, I have journaled a shaft 21 through the side bars adjacent the rear end piece and have rigidly secured to the free ends thereof sprocket wheels 22 which are arranged adjacent the inner periphery of the supporting wheels 10 and in mesh with the large internal gears 23 carried by the rims of the wheels. Rigidly connected to the shaft 21 and arranged in alinement with the sprocket wheels 13 are sprocket wheels 24 which are engaged by chains 25, the latter being also trained about the sprocket wheels 13 and because of the rigid connection between the wheels 13, the sleeves 12, and the cylinder 11, it can easily be seen that when the implement is being moved sprocket wheels 22 on the shaft being in mesh with the internal gear 23 rotate at a greater rate of speed than the supporting wheels and movement also being imparted to the cylinder by means of the sprocket wheels 13 and 24 and the chains 25 operating thereabout.

For the purpose of lifting stalks from the ground I have rotatably mounted in the side pieces 2 and 3 at points substantially intermediate the cross bar 7 and the cylinder 11 a shaft 26, the latter having depending therefrom and arranged in uniformly spaced apart intervals throughout the length of the shaft, arcuately formed rake teeth 27 which are rigidly secured to the shaft and prevented from movement thereon by means of keys 28. The free lower ends of the teeth each have welded or otherwise rigidly secured thereto my improved spring-like guiding members 29 which conform substantially to the contour of the teeth and which are arranged in spaced apart relation with the teeth, the free upper ends of the guiding members being curved rearwardly as at 30 for a purpose to be hereinafter described. Because of the construction and arrangement of these guiding members it can easily be seen that they also serve the purpose of guarding the rake teeth and absorb shocks likely to be transmitted to the same especially when the implement is being used on rough and uneven ground.

For the purpose of supporting the stalks after they have been lifted by the guarding members and the teeth and for facilitating the cutting of the same I have provided a cross bar 31 and rigidly mounted the same in spaced parallel relation with the shaft 26 and the cylinder 11 in the side pieces of the frame 1 at points substantially between the shaft 26 and the cylinder 11, the bar having extending laterally from its rear face and in parallel relation with the sides of the frame, a plurality of supporting pins 32 which are arranged in parallel relation with each other and in pairs. Each of the pins 32 in this instance consists preferably of a rectangular body portion 32 which has one end thereof reduced to provide a screw threaded shank 33 for engagement with sockets 34 in the rear face of the cross bar 31. By this arrangement it will be noted that the pins being arranged in pairs and in uniformly spaced relation with each other are further disposed in such a manner that the cutting elements 14 which are arranged spirally about the cylinder pass between each pair of pins, the latter supporting the stalks and facilitating the operation of the cutting elements which because of their spiral arrangement successively pass through the pins and cause the same to be cut in short pieces.

For the purpose of raising and lowering the teeth 27 and the guiding members 29, I have provided a substantially arc-like supporting structure 35 the respective ends of which are rigidly connected to the cross bars 7 and 31 at a point adjacent one end thereof and have pivotally mounted on the same a handle lever 36 by means of a suitable fastening element 37, the lower end of the lever being bent outwardly at right angles and provided with an opening adjacent its free end for pivotal engagement with a link 38, the free end of which is engaged upon an extension 39 which projects at substantially right angles from the upper end of the outer of the teeth 27, the latter being disposed below and slightly about one side of the supporting structure 35.

In order to hold the teeth in various adjusted positions I have provided the upper surface of the structure 35 with an arcuate rack 4, the respective ends of which are secured by means of suitable fastening devices 41 and the teeth of which are engaged by a pawl 41', the latter being connected to the upper end of the lever 36 by means of a rod 42, the respective ends of which are loosely connected in the pawl and one end of a bell crank lever 43, the latter being fulcrumed by means of a suitable fastening device to the upper end of the lever 36. For the purpose of effecting positive engagement of the pawl 41' and for preventing movement of the rod 42, I have provided a guiding collar 44 and secured the same about the rod to the lever 36.

A seat 45 is provided for the convenience of the driver of the implement and is suitably supported from the cross piece 7 by means of a spring-like supporting member 46.

The operation of my invention is as follows:—When the supporting wheels are being moved forward the cog wheels 22 being in engagement therewith cause the shaft 21 to be rotated at a greater rate of speed than the axle shaft 9, the shaft 21 transmitting motion to the cylinder 11 through the medium of the sprocket wheels 13 and 24 and the chain 25 trained thereabout which cause the cylinder to rotate at a greater rate of speed. It can be easily seen that because of the teeth being arranged in close relation with the ground that the guarding members 29 will engage the stalks as the machine is moving and dispose them upon the supporting pins 32 whereupon they will be engaged by the cutting elements 14 disposed in spiral relation about the cylinder 11 and because of this arrangement they will successively pass between each of the pairs of pins and cut the stalks into small pieces where they are finally distributed over the ground to be plowed under when next planting.

Although I have shown and described the preferred embodiment of my invention it will be obvious to those skilled in the art to which this invention relates that I am not limited to the exact construction herein shown and described, however, I desire that great stress be laid upon the coöperation of the lifting, supporting and cutting means, all of which being disposed above the surface of the ground produce an arrangement possessing an improved manner for cutting stalks into small pieces, the previous devices of this character having cutting mechanism arranged in closed relation with the ground which made it difficult for accomplishing this purpose besides being detrimental to the implement due to shocks and jars likely to be transmitted to the same, while the machine was passing over rough and uneven ground.

From the above description taken in connection with the accompanying drawings, it will be seen that I have provided a device that is simple in construction and containing the minimum number of parts that can be cheaply manufactured and easily assembled, and when assembled can be placed upon the market and sold at a minimum cost.

It will be understood that the above description and accompanying drawings comprehend only the general and preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

1. In a stalk cutter, cutting and supporting means for the stalks, lifting means for the stalks, and means associated with lifting means and coöperating with the cutting means and supporting means for guiding the stalks and for guarding the lifting means.

2. A stalk cutter including a wheeled frame, a cutting and supporting mechanism mounted thereon, lifting means coöperating therewith, guiding and guarding means carried by said lifting means, and means for raising and lowering said lifting means.

3. A stalk cutter including a supporting frame, cutting and supporting means for the stalks mounted thereon, lifting means associated therewith, and resilient members carried by the lifting means for guiding the stalks and for protecting the lifting means.

4. A stalk cutter including a frame, supporting wheels therefor, a rotating cylinder on said frame having a plurality of cutting elements extending therefrom, supporting means for the stalks coöperating with the cutting elements, lifting means for the stalks, guiding and guarding means carried by the lifting means and associated with the supporting and cutting means, and means for raising and lowering the lifting means.

5. A stalk cutter including a frame, a shaft rotatably mounted in said frame, supporting wheels rotatably mounted upon the free ends of said shaft, a cylinder rotatably mounted upon said shaft, a plurality of cutting elements extending from said cylinder and arranged spirally thereabout, means connecting the cylinder and the supporting wheels for increasing the speed of the cylinder, a plurality of spaced apart pins mounted and arranged in alinement with said cutting elements, said pins supporting stalks and facilitating the cutting of the same, a rake bar disposed in front of said pins, resilient members carried by the teeth of the rake bar for guarding the teeth and guiding the stalks to said supporting pins, and means for raising and lowering said rake bar.

6. A stalk cutter including a frame, a shaft journaled therethrough, supporting wheels on said shaft, a cylinder rotatably mounted on said shaft, a plurality of uniformly spaced pins arranged adjacent said cylinder for supporting stalks, a plurality of cutting elements projecting from said cylinder and arranged in spiral relation about the outer surface thereof for successively passing through said pins for facilitating the cutting of stalks, and means connecting said wheels and said cylinder for increasing the speed of the cylinder during the forward movement of the frame.

7. A stalk cutter including a frame, a shaft journaled therethrough, supporting wheels on said shaft, internal gears carried by said supporting wheels, a rotating cylinder on said shaft, a plurality of cutting elements on said cylinder, another shaft journaled in said frame, gears carried by the respective ends of the last mentioned shaft and arranged in mesh with the internal gears, an enlarged gear carried by said last mentioned shaft, a chain operating about said enlarged gear for rotating the cylinder at a greater rate of speed than the speed of the supporting wheels, and stalk supporting means associated with the cutting elements for facilitating the cutting of the stalks.

8. A stalk cutter including a wheeled frame, a cylinder rotatably mounted in the frame, a plurality of cutting elements extending from said cylinder and arranged spirally thereabout, a plurality of uniformly spaced pins mounted in pairs and arranged so that said cutting elements will successively pass between the pairs during the actuation thereof, said pins being adapted for supporting stalks and facilitating the cutting thereof, lifting means for the stalks, and means associated with the lifting means coöperating with the cutting elements for supporting and guiding the stalks and for guarding the lifting means.

In testimony whereof I affix my signature in presence of two witnesses.

DAVID G. JONES.

Witnesses:
W. C. RATCLIFF,
GRACE F. THOMAS.

Copies of this patent may be obtained for five cents each, by addressing the "Commissioner of Patents, Washington, D. C."